United States Patent
Mitchell et al.

(10) Patent No.: US 10,115,503 B2
(45) Date of Patent: Oct. 30, 2018

(54) TERMINAL-THERMISTOR ASSEMBLY

(71) Applicant: Yazaki North America, Inc., Canton, MI (US)

(72) Inventors: Brandon Eugene Mitchell, Redford, MI (US); Alexander Joseph Advey, Ypsilanti, MI (US)

(73) Assignee: YAZAKI NORTH AMERICA, INC., Canton, MI (US)

( * ) Notice: Subject to any disclaimer, the term of this patent is extended or adjusted under 35 U.S.C. 154(b) by 0 days.

(21) Appl. No.: 14/990,267

(22) Filed: Jan. 7, 2016

(65) Prior Publication Data

US 2017/0200538 A1   Jul. 13, 2017

(51) Int. Cl.
| | | |
|---|---|---|
| H01C 7/00 | (2006.01) | |
| H01C 1/02 | (2006.01) | |
| H01R 4/48 | (2006.01) | |
| G01K 1/14 | (2006.01) | |
| H01R 11/26 | (2006.01) | |
| H01R 13/66 | (2006.01) | |

(52) U.S. Cl.
CPC .............. *H01C 7/008* (2013.01); *G01K 1/14* (2013.01); *H01C 1/02* (2013.01); *H01R 4/4818* (2013.01); *H01R 11/26* (2013.01); *H01R 13/6683* (2013.01)

(58) Field of Classification Search
CPC ........ H01C 7/008; H01C 1/02; H01R 4/4818; H01R 4/48
USPC ........... 338/22 R, 25, 160, 306, 315; 439/83, 439/439, 2, 382–385; 29/612
See application file for complete search history.

(56) References Cited

U.S. PATENT DOCUMENTS 5,043,692 A * 8/1991 Sites .................. G01K 15/00
                                                     338/22 R
5,627,343 A * 5/1997 Brandolf ............... H02G 3/22
                                                     156/86

(Continued)

FOREIGN PATENT DOCUMENTS

| JP | S53-032781 A | 3/1978 |
| JP | H05-272850 A | 10/1993 |

(Continued)

OTHER PUBLICATIONS

Extended European Search Report issued in corresponding Application No. EP16207542 by the European Patent Office dated May 26, 2017.

*Primary Examiner* — Kyung Lee
*Assistant Examiner* — Iman Malakooti
(74) *Attorney, Agent, or Firm* — Foley & Lardner LLP

(57) ABSTRACT

A terminal-thermistor assembly may include a thermistor and a terminal. The thermistor may include a body encasing a temperature-sensing element. The terminal may include a shaft and a housing disposed on an end of the shaft. The housing may include a cavity, a protrusion extending into the cavity and a cantilevered spring element. The spring element may be resiliently flexible between a first position in which a space between the spring element and the protrusion is less than a thickness of the body of the thermistor and a second position in which the space between the spring element and the protrusion is equal to the thickness of the body. A first surface of the thermistor body may contact the spring element and a second surface of the thermistor body opposite the first surface may contact the protrusion when the body is received within the cavity.

20 Claims, 9 Drawing Sheets

(56) References Cited

U.S. PATENT DOCUMENTS

| | | |
|---|---|---|
| 6,693,394 B1 | 2/2004 | Guo et al. |
| 7,468,874 B1 | 12/2008 | Guo |
| 7,531,914 B1 | 5/2009 | Moore |
| 8,794,827 B2 | 8/2014 | Ishikawa et al. |
| 9,261,412 B2 | 2/2016 | Yoshida et al. |
| 2003/0217458 A1* | 11/2003 | Haga ............... H01C 1/012 29/612 |
| 2011/0144823 A1 | 6/2011 | Muller et al. |
| 2015/0288085 A1* | 10/2015 | Moncayo ........... H05K 1/115 439/83 |
| 2016/0111831 A1* | 4/2016 | Kawai ............... H01R 13/04 439/620.21 |

FOREIGN PATENT DOCUMENTS

| | | |
|---|---|---|
| JP | H09-063698 A | 3/1997 |
| JP | 2014-519695 A | 8/2014 |
| JP | 2015-006102 A | 1/2015 |
| JP | H04-082182 A | 3/2016 |
| WO | 2014208654 A1 | 12/2014 |

\* cited by examiner

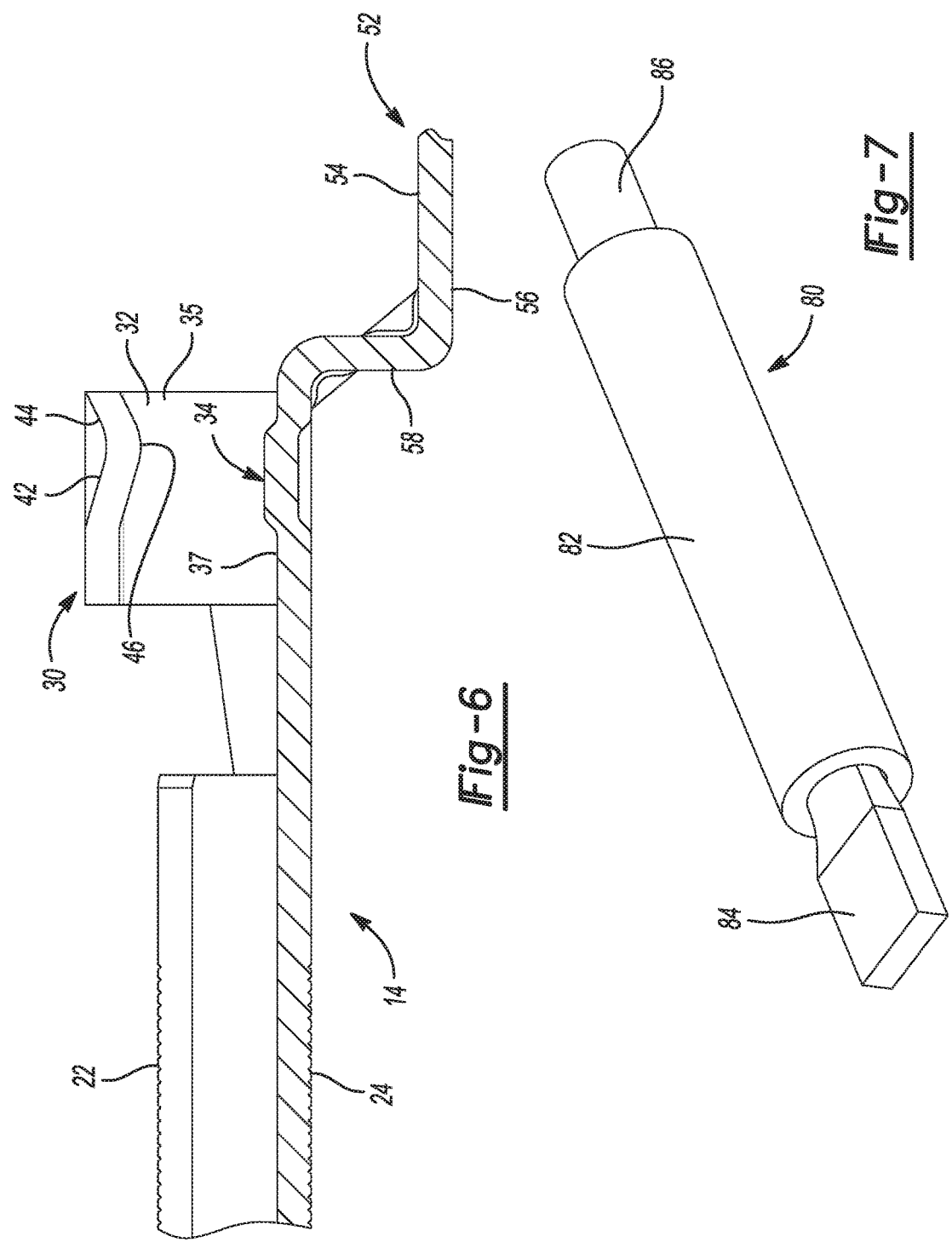

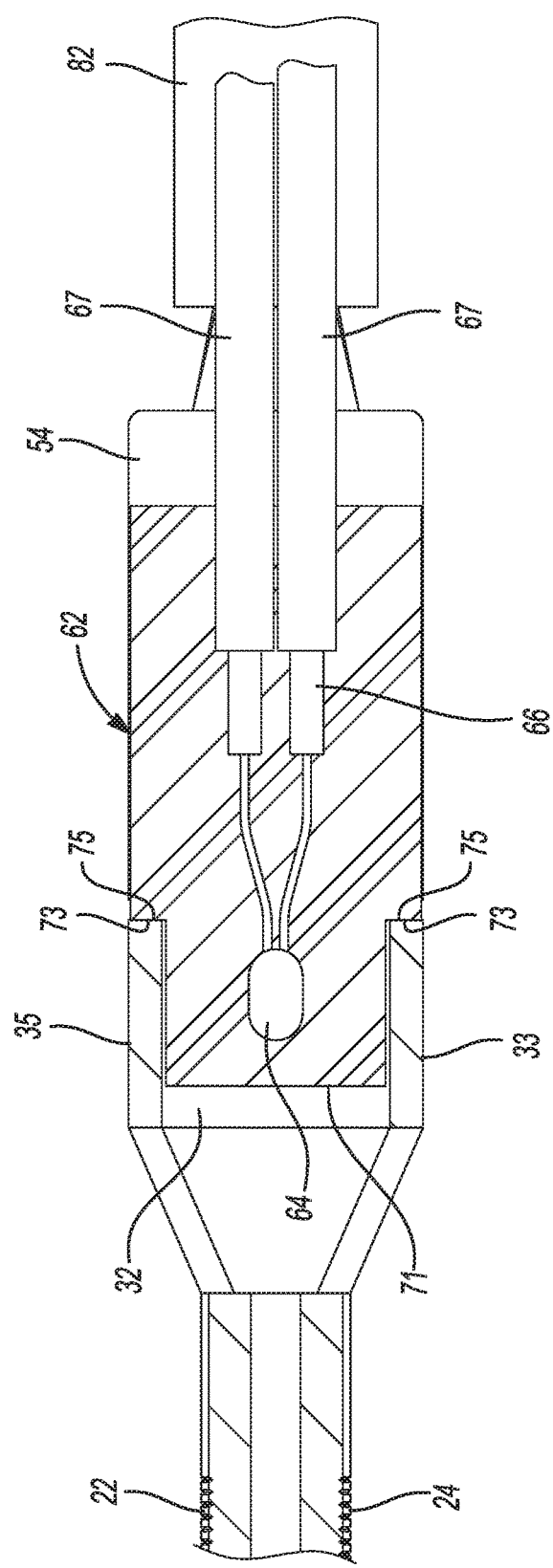

TERMINAL-THERMISTOR ASSEMBLY

FIELD

The present disclosure relates to a terminal-thermistor assembly.

BACKGROUND

This section provides background information related to the present disclosure and is not necessarily prior art.

A conventional terminal-thermistor assembly may include a thermistor device and a terminal that are held together by additional components. The thermistor device measures temperature from a wire or surrounding elements, which can potentially cause inaccurate readings and delayed response time. Such inaccurate readings and delayed response times can potentially lead to damage to and/or poor performance of a system in which the terminal-thermistor assembly is installed. The present disclosure provides an improved terminal-thermistor assembly and methods that improve the accuracy and response time of temperature readings, thereby, improving the reliability and performance of a system in which the terminal-thermistor assembly is installed.

SUMMARY

This section provides a general summary of the disclosure, and is not a comprehensive disclosure of its full scope or all of its features.

In one form, the present disclosure provides a terminal-thermistor assembly that may include a thermistor and a terminal. The thermistor may include a body encasing a temperature-sensing element. The terminal may include a shaft and a housing disposed on an end of the shaft. The housing may be a single unitary body may include a cavity, a protrusion extending into the cavity and a cantilevered spring element extending into the cavity. The spring element may be resiliently flexible between a first position in which a space between the spring element and the protrusion is less than a thickness of the body of the thermistor and a second position in which the space between the spring element and the protrusion is equal to the thickness of the body. A first surface of the thermistor body may contact the spring element and a second surface of the thermistor body opposite the first surface may contact the protrusion when the body is received within the cavity.

In some configurations, the spring element is undeflected prior to the thermistor being inserted into the cavity and deflected opposite the protrusion when the thermistor is fully inserted into the cavity.

In some configurations, the first surface of thermistor body is in continuous connection with the protrusion and the second surface of the thermistor body is in continuous connection with the spring element when the thermistor is fully inserted into the cavity.

In some configurations, a second flexible spring element is fixedly attached to the housing.

In some configuration, the flexible spring elements extending from the housing form an L shape.

In some configurations, the housing includes a platform forming an L shape.

In some configurations, the platform includes a platform arm and a platform surface perpendicular to each other.

In some configurations, a power conduit provides power to the terminal.

In some configurations, the power conduit is contained in a heat shrunk tube.

In some configurations, the power conduit includes a first end, the first end attached to the platform.

In some configurations, the thermistor measures temperature from the terminal.

In some configurations, the spring element may include a tab element contact surface that extends inside the cavity prior to the thermistor being inserted into the therein.

In some configurations, the spring elements may include a connector arm and a tab element extending perpendicular to the connector arm, the tab element having a descending portion extending toward the protrusion and an ascending portion extending away from the protrusion and connecting at the tab element contact surface.

In another form, the present disclosure provides a terminal for engaging a thermistor including a body encasing a temperature-sensing element. The terminal may include a shaft and a housing disposed on an end of the shaft, the housing including a cavity, a protrusion extending into the cavity and a cantilevered spring element extending into the cavity. The spring element may be resiliently flexible between a first position in which a space between the spring element and the protrusion is less than a thickness of the body of the thermistor and a second position in which the space between the spring element and the protrusion is equal to the thickness of the body. The spring element may contact a first surface of the body and the protrusion may contact a second surface of the body opposite the first surface when the body is received within the cavity.

In some configurations, the second surface of the thermistor body is in continuous contact with the protrusion and the first surface of the thermistor body is in continuous contact with the spring element when the thermistor is fully received into the cavity.

In some configurations, a second flexible spring element is fixedly attached to the housing.

In some configurations, the terminal includes a platform forming an L shape and extending from the housing.

In some configurations, the terminal includes a power conduit that powers the terminal.

In some configurations, the power conduit includes a first end attached to the platform.

In some configurations, the thermistor measures temperature from the power conduit and terminal.

In another form, the present disclosure provides a terminal-thermistor assembly that may include a thermistor and a terminal. The thermistor may include a body encasing a temperature-sensing element. The terminal may include a shaft and a housing disposed on an end of the shaft. The housing may include first and second walls that are parallel to each other and a third wall that is perpendicular to the first and second walls. The first, second and third walls may be integrally formed with each other and define a cavity. The third wall may include a protrusion extending into the cavity. The first and second walls may include first and second cantilevered spring elements, respectively. The first and second spring elements may extend into the cavity and may be resiliently flexible between a first position in which a space between the spring element and the protrusion is less than a thickness of the body of the thermistor and a second position in which the space between the spring element and the protrusion is equal to the thickness of the body. A first surface of the body may contact the spring element and a second surface of the body opposite the first surface may contact the protrusion when the body is received within the cavity.

In some configurations, each of the spring elements includes a connector arm and a tab element extending perpendicular to the connector arm. The tab element may include a descending portion extending toward the protrusion and an ascending portion extending away from the protrusion and connecting at a tab element contact surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a portion of a side view of the terminal taken along line 6-6 of FIG. 3;

FIG. 7 is a perspective view of a power conduit of the terminal-thermistor assembly shown in FIG. 1;

FIG. 12 is a cross-sectional view of a portion of the terminal-thermistor assembly taken along line 12-12 of FIG. 1.

Corresponding reference numerals indicate corresponding parts throughout the several views of the drawings.

DETAILED DESCRIPTION

Example embodiments will now be described more fully with reference to the accompanying drawings.

Figure 1:
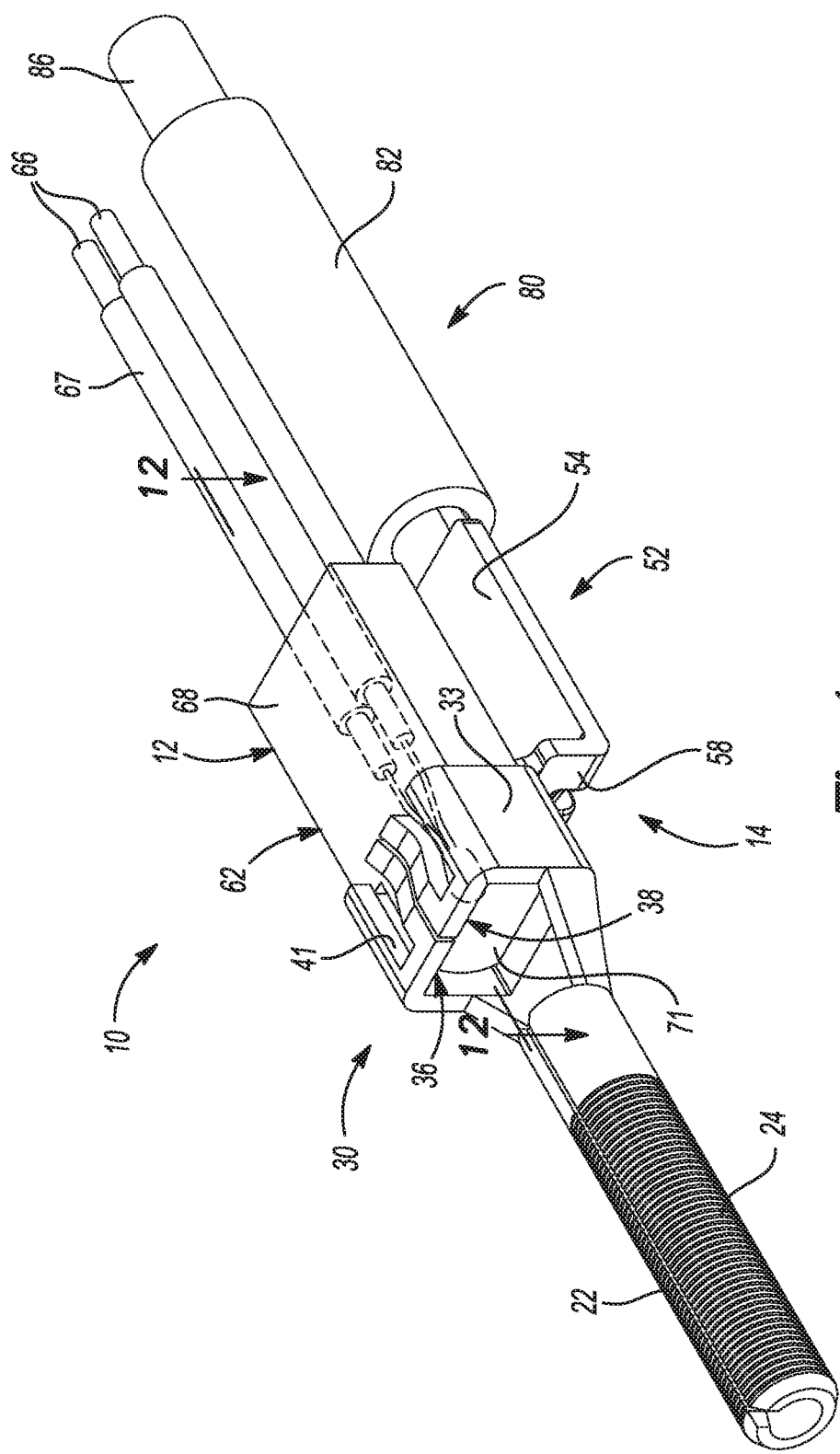
FIG. 1 is a perspective view of a terminal-thermistor assembly according to the principles of the present disclosure.

With reference to FIG. 1, a terminal-thermistor assembly 10 is provided that may include a thermistor 12 and a terminal 14. The terminal 14 may receive the thermistor 12 such that the thermistor 12 can detect a temperature of the terminal 14. As will be described in more detail below, the terminal 14 securely retains the thermistor 12 and maintains intimate contact with the thermistor 12 to allow the thermistor 12 to accurately detect temperature of the terminal 14.

Figure 2:
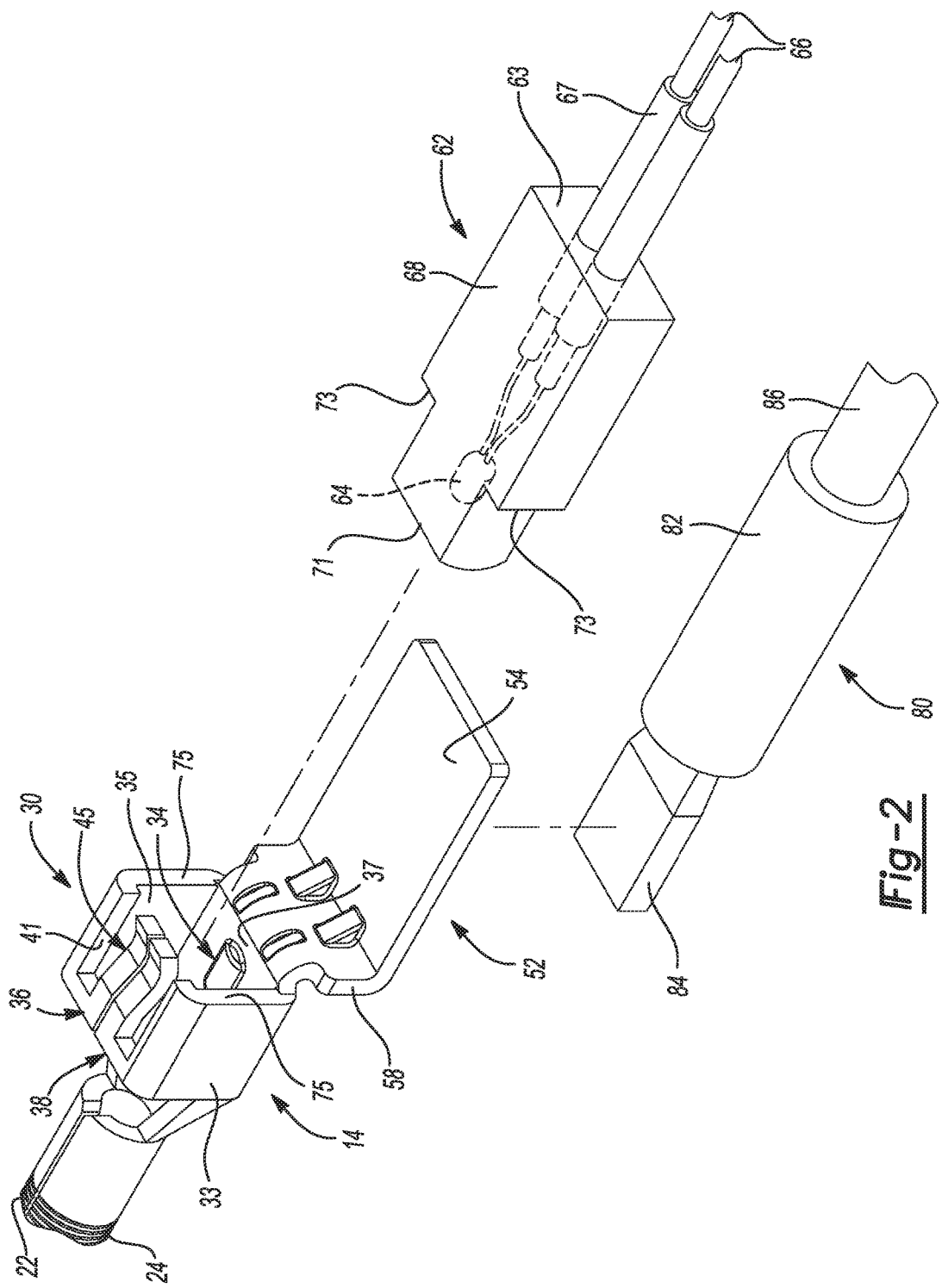
FIG. 2 is an exploded view of the terminal-thermistor assembly shown in FIG. 1.

As shown in FIG. 2, the thermistor 12 may include a thermistor element 64 (i.e., a temperature-sensing element), wires 66, and a thermistor body 62 that encases the thermistor element 64 and portions of the wires 66. Protective tubing 67 may be heat shrunk over portions of the wires 66 to protect the wires 66 from surrounding elements. The thermistor element 64 can be a conventional thermistor such as an NTC (negative temperature coefficient) type or a PTC (positive temperature coefficient) type, for example.

The thermistor body 62 may include a first thermistor surface 68 and a second thermistor surface 70 (FIG. 8) parallel to each other. The first and second thermistor surfaces 68, 70 may be perpendicular to a third thermistor surface 63 through which the wires 66 extend. The thermistor body 62 may include a plug end 71 disposed between shoulders 73.

Figure 11:
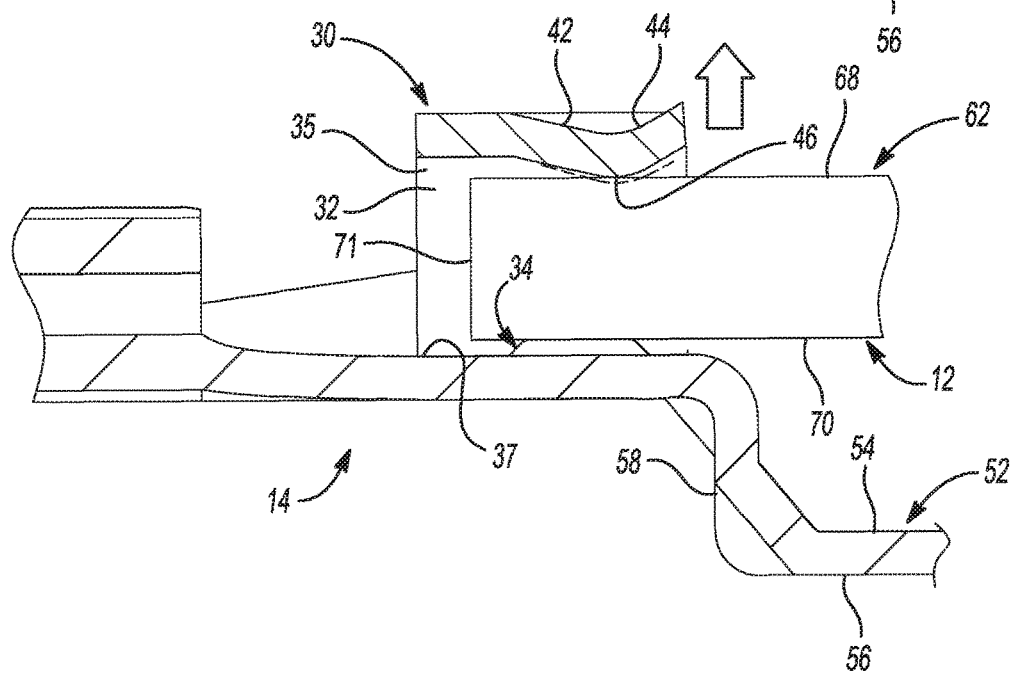
FIG. 11 is a portion of a side view of the terminal shown FIG. 6 with the thermistor fully inserted in the cavity of the housing.

As shown in FIG. 11, the first and second thermistor surfaces 68, 70 may be in intimate contact with the terminal 14 once the plug end 71 of the thermistor body 62 is fully inserted therein. The thermistor body 62 may conduct heat from the terminal 14 to the thermistor element 64. The wires 66 extending out of the third thermistor surface 63 may extend to a control module (not shown) and/or a user interface (not shown) to allow the control module and/or user to monitor temperature readings of the thermistor element 64. It is also understood that the temperature readings from the terminal 14 may be affected by other heat sources from the surrounding environment.

Figure 3:
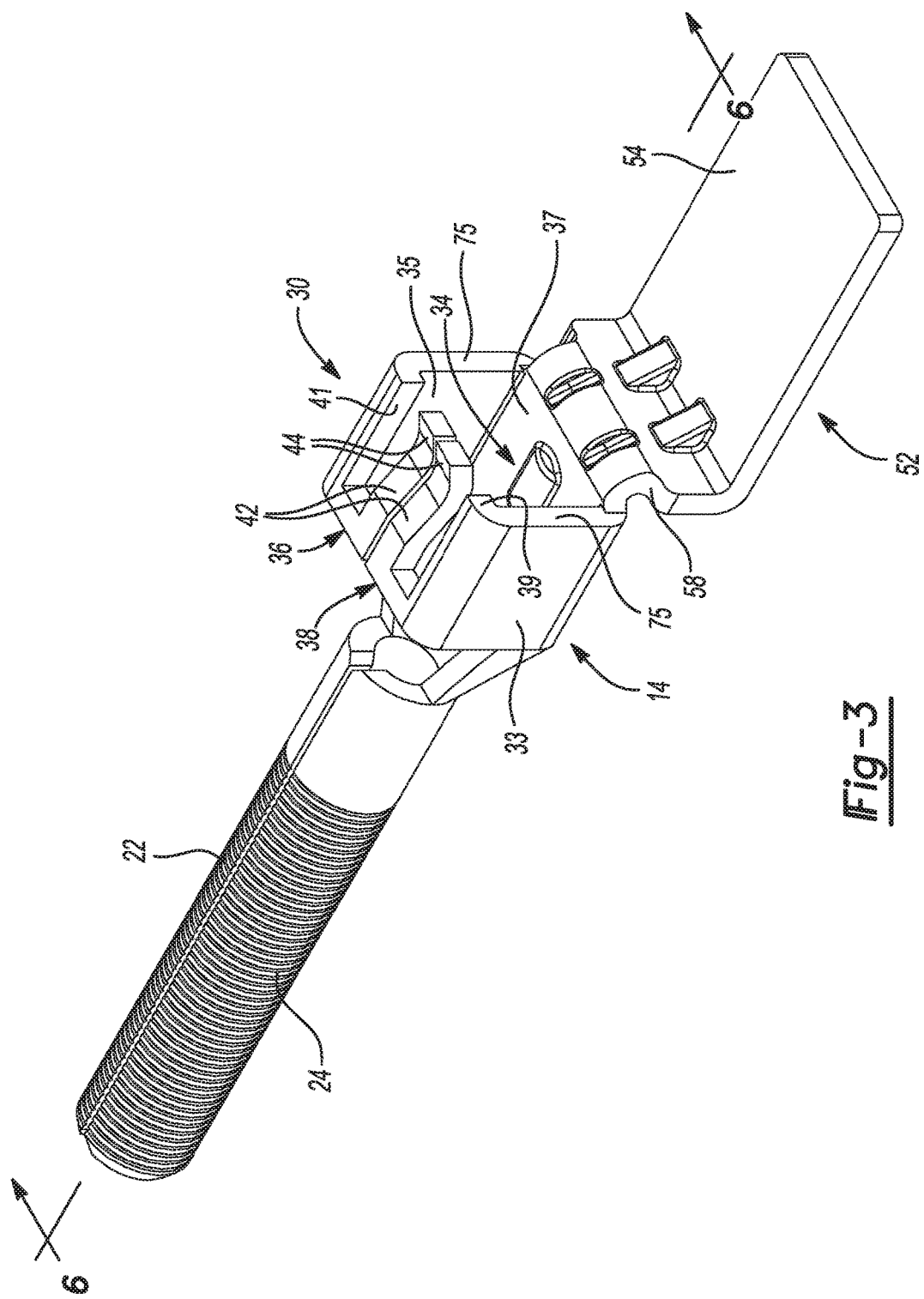
FIG. 3 is a perspective view of a terminal of the terminal-thermistor assembly shown in FIG. 1.

As shown in FIGS. 2 and 3, the terminal 14 may include a connection shaft 24, a receptacle or housing 30 and a platform 52. The housing 30 may be integrally formed with the shaft 24 or otherwise fixedly attached thereto. The platform 52 may be integrally formed with the housing 30 or otherwise fixedly attached thereto. The shaft 24 may include a corrugated or threaded portion 22 that can be engaged with another electrical component (not shown; e.g., an external circuit or an electrical receptacle) to provide electrical communication therebetween.

Figure 4:
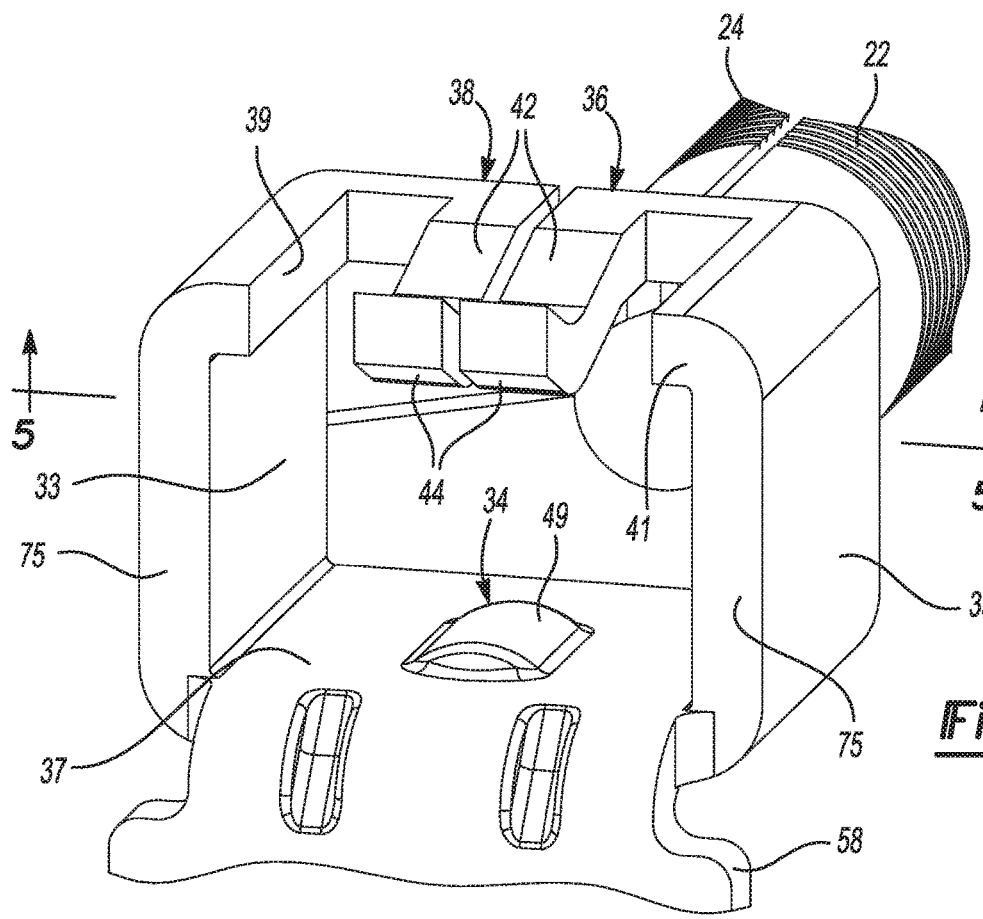
FIG. 4 is a front view of a housing of the terminal shown in FIG. 3.

As shown in FIG. 3, the housing 30 may be fixedly attached to an end of the shaft 24. The housing 30 may be generally box-shaped and may form a cavity 32 (FIG. 6) that slidably receives the plug end 71 of the thermistor body 62. As shown in FIGS. 3 and 4, the housing 30 may include first, second and third walls 33, 35, 37. The first and second walls 33, 35 may be parallel to each other. The third wall 37 may be perpendicular to the first and second walls 33, 35. The first wall 33 may include a first lip 39 that extends toward the second wall 35. The second wall 35 may include a second lip 41 that extends toward the first wall 33. The first, second and third walls 33, 35, 37 may define an opening into the cavity 32. First and second resiliently flexible spring elements 38, 36 may be cantilevered from the first and second walls 33, 35, respectively. The cavity 32 may be defined between the first and second walls 33, 35 and between the third wall 37 and the lips 39, 41. As shown in FIG. 4, the third wall 37 may include a bump feature or protrusion 34 that protrudes into the cavity 32 toward the spring elements 36, 38. The spring elements 36, 38 and the bump feature 34 contact the thermistor body 62 and cooperate to retain the thermistor body 62 in the cavity 32. As shown in FIG. 12, the shoulders 73 of the thermistor body 62 may abut edges 75 of the first and second walls 33, 35 when the plug end 71 is fully inserted into the cavity 32.

Figure 5:
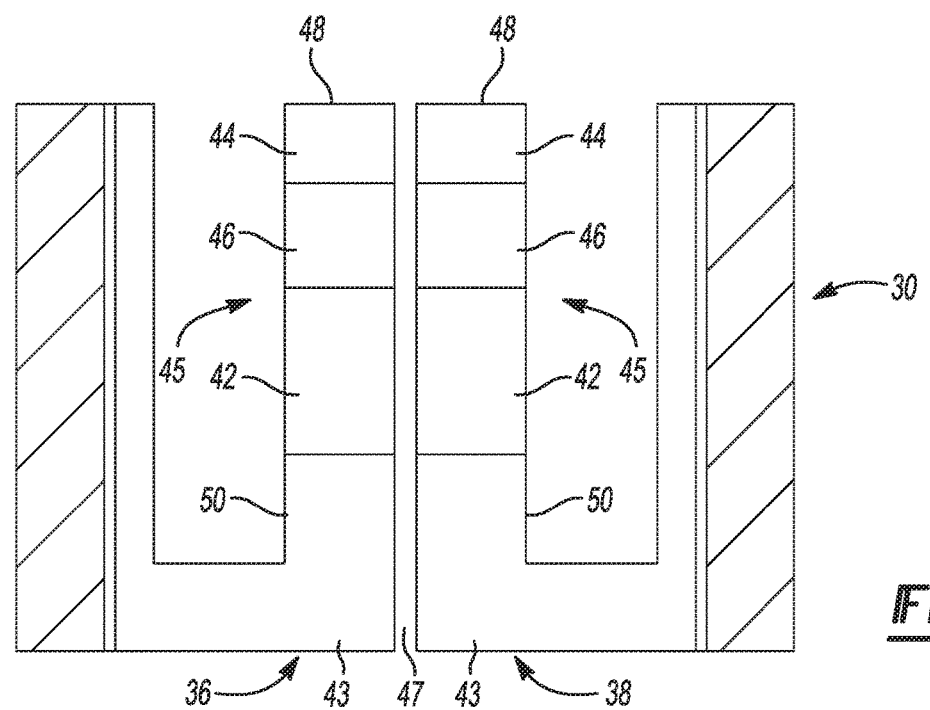
FIG. 5 is a cross-sectional view of the housing taken along line 5-5 of FIG. 4.

As shown in FIGS. 3-5, the spring elements 38, 36 may extend from the first and second walls 33, 35, respectively. Each of the spring elements 36, 38 may include a connector arm 43 and a resiliently flexible tab element 45. The connector arms 43 may be fixedly attached to respective walls 33, 35. The connector arm 43 and the tab element 45 may be positioned and integrally formed perpendicular to each other to form a generally L-shape. The connector arm 43 may be attached to the tab element 45 at a tab element proximal end 50. A tab element distal end 48 can be resiliently deflected into and out of the cavity 32. The spring elements 36, 38 may be separated from each other by a gap 47 to allow the spring elements 36, 38 to flex relative to each other. In other configurations, however, the spring elements 36, 38 could be integrally formed as a single piece. The tab element proximal end 50 and the connector arm 43 may be integrally formed on the same plane.

Figure 10:
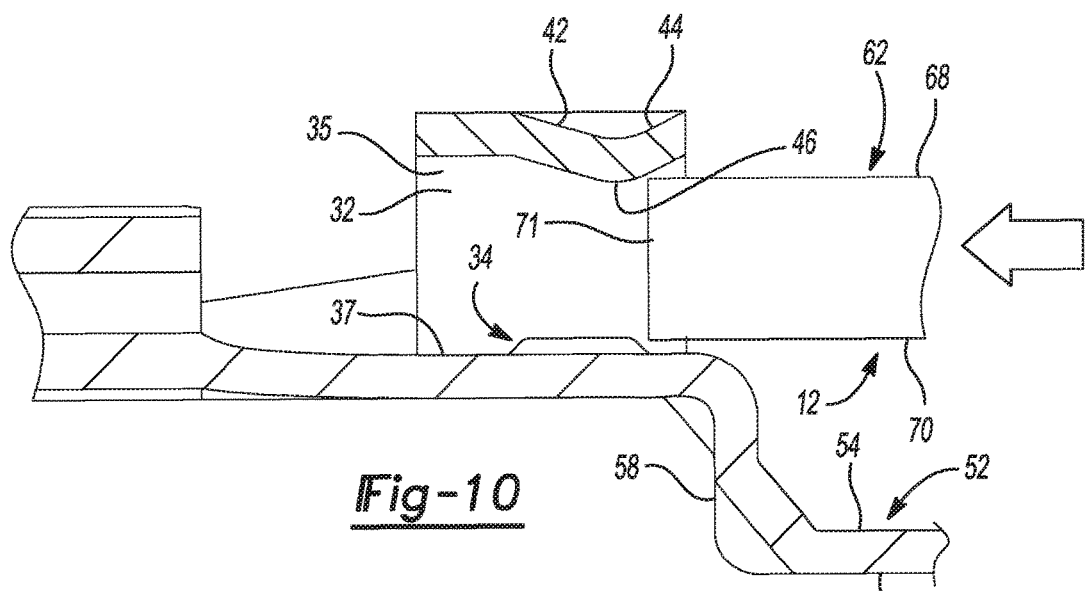
FIG. 10 is a portion of a side view of the terminal shown FIG. 6 with the thermistor being inserted into the cavity of the housing.

The tab elements 45 may contour defined by a descending arm portion 42 and an ascending arm portion 44. The descending arm portion 42 may extend into the cavity 32 (i.e., toward the third wall 37) as it extends away from the tab element proximal end 50. The ascending arm 44 may extend away from the third wall 37 as it extends away from the tab element proximal end 50. As shown in FIG. 5, the descending arm 42 and the ascending arm 44 are connected at a tab element contact surface 46 inside the cavity 32. The tab element contact surface 46 remains in the cavity 32 of the housing 30 when the flexible spring elements 36, 38 are in a rest position (FIG. 10) and are deflected away from the third wall 37 as the thermistor body 62 is inserted into the cavity 32 (FIG. 11).

As shown in FIGS. 3 and 4, the bump feature 34 has a convex surface profile that extends into the cavity 32 and may be positioned generally opposite the tab elements 45 of the spring elements 36, 38. The thermistor body 62 may contact the bump feature 34 at a bump contact portion 49 at an extremity of the bump feature 34. The bump contact 49 may be in continuous connection with the second thermistor surface 70 of the thermistor body 62 once the thermistor 12 is fully inserted into the cavity 32.

Figure 8:
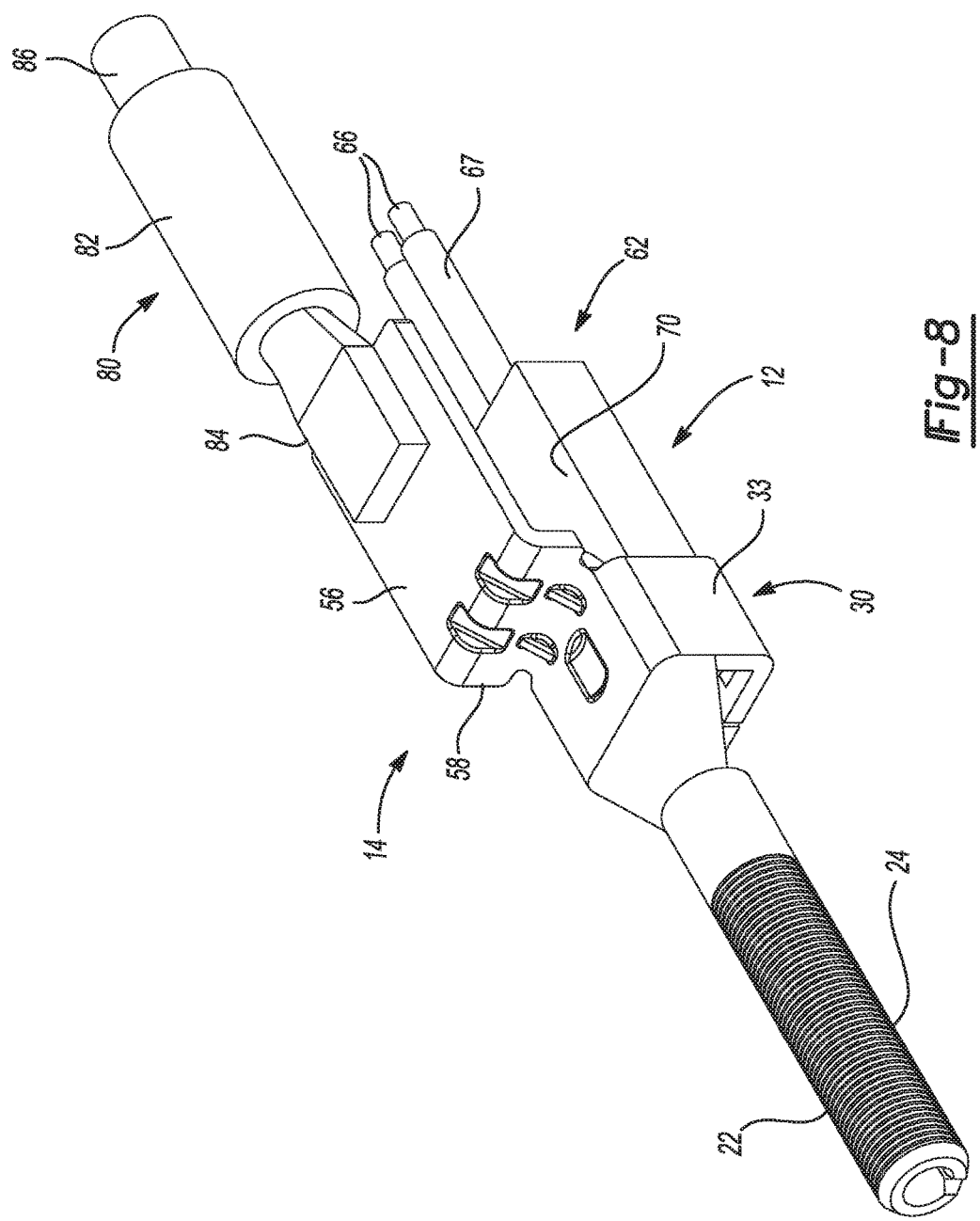
FIG. 8 is a bottom view of the terminal-thermistor assembly shown in FIG. 1.
Figure 9:
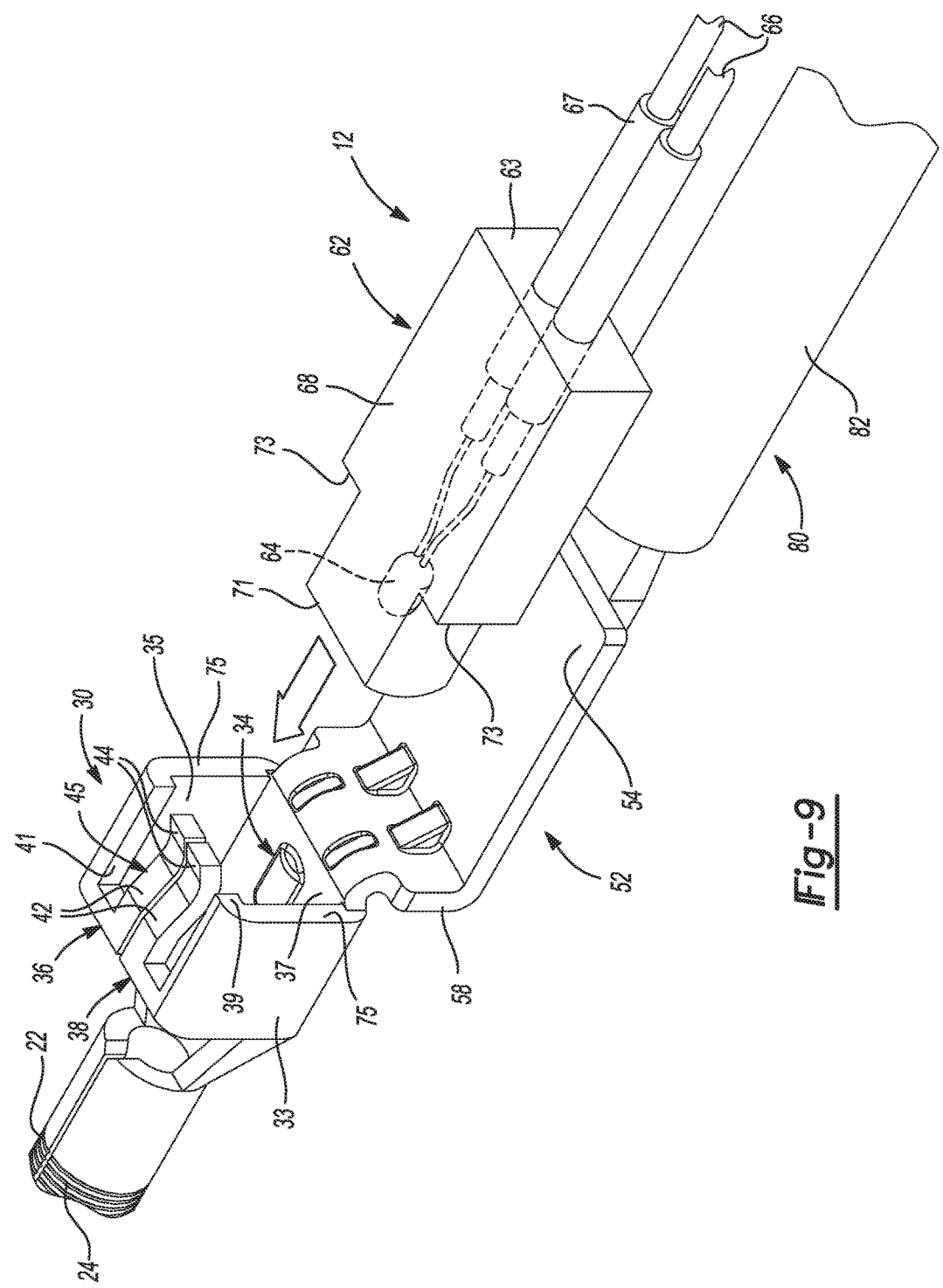
FIG. 9 is perspective view of a portion of the terminal assembly shown in FIG. 1 with a thermistor being inserted into a cavity of the housing.

As shown in FIGS. 3 and 8, the platform 52 may extend from the housing 30 and may be generally L-shaped. The platform 52 may include a platform arm 58, a first platform surface 54 (FIG. 3) and a second platform surface 56 (FIG. 8). The first and second platform surfaces 54, 56 may be parallel to each other. As shown in FIG. 8, the second platform surface 56 may be connected to a power conduit 80 at an uninsulated end 84 to facilitate electrical communication between the terminal 14 and a power source (not shown). The power conduit 80 can include insulating tubing 82 wrapped around wire 86. It is understood that the power conduit 80 may also be connected to the first platform surface 54 to obtain the same electrical communication between the terminal 14 and the power source (not shown). The platform arm 58 may be perpendicular to the first and second platform surfaces 54, 56.

With continued reference to FIGS. 1-12, installation and operation of the terminal-thermistor assembly 10 will be described in detail. As shown in FIG. 8, the power conduit wire 86 is connected to the second platform surface 56 of the housing 30 via the power conduit uninsulated end 84 to facilitate electrical communication between the power source (not shown) and the terminal 14. The platform arm 58 perpendicular to the first and second thermistor surfaces 68, 70 may provide clearance space so that the power conduit tube 82 does not make contact with the thermistor 12 once the thermistor 12 is fully inserted into the housing cavity 32.

The shaft 24 of the terminal 14 can be connected to an electrical component (not shown) to provide electrical communication between the electrical component and the power source through the power conduit 80 and the terminal 14. It will be appreciated that the shaft 24 can be engaged with the electrical component before or after the power conduit 80 is attached to the platform 52. The terminal corrugated portion 22 may provide additional support for securing the terminal 14 and electrical component (not shown) once connected.

Prior to the thermistor 12 being slidably inserted into the cavity 32 of the housing 30, the bump feature 34 and the flexible spring elements 36, 38 are in a rest position (i.e., an undeflected state) (FIG. 10) whereby the distance between the bump contact 49 and the tab element contact surfaces 46 of the spring elements 36, 38 (i.e., in a direction perpendicular to the third wall 37) is less than a thickness of the plug end 71 (i.e., a distance between the first and second thermistor surfaces 68, 70). As the plug end 71 of the thermistor body 62 is slidably inserted into the housing cavity 32 (FIGS. 9-11), the first and second thermistor surfaces 68, 70 connect to the tab element contact surfaces 46 and the bump contact 49, respectively (FIG. 11). As shown in FIG. 11, contact between the tab element contact surface 46 and the first thermistor surface 68 deflects the tab element 45 out of the cavity 32 (i.e., away from the third wall 37). During the duration of deflection, the tab element contact surface 46 remains connected with the first thermistor surface 68. Similarly, the bump contact 49 positioned at an extremity of the bump feature 34 also remains connected to the second thermistor surface 70. As shown in FIG. 12, the thermistor body 62 can be pushed into the cavity 32 until the shoulders 73 of the thermistor body 62 contact the edges 75 of the first and second walls 33, 35 of the housing 30. With the thermistor body 62 fully received within the cavity 32, the spring elements 36, 38 (being in a resiliently deflected state) exert a force on the thermistor body 62 toward the bump feature 34, thereby pressing the thermistor body 62 into intimate contact with the spring elements 36, 38 and the bump feature 34.

With the thermistor 12 installed within the housing 30 as described above, the thermistor element 64 may measure the heat conducted from the terminal 14 via the continuous connection between the first thermistor surface 68 and the tab element contact surface 46, and second thermistor surface 70 and the bump contact 49. Temperature data obtained by the thermistor element 64 can be transmitted to the control module or user interface via the wires 66. The first thermistor surface 68 and the tab element contact surface 46 and the second thermistor surface 70 and the bump contact 49 described above securely retains the thermistor body 62 within the housing 30 while facilitating accurate temperature readings of the terminal 14 with minimal response time.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the " may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first, " "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A terminal-thermistor assembly comprising:
  a thermistor including a body encasing a temperature-sensing element; and
  a terminal including a shaft and a housing disposed on an end of the shaft, the housing being a single unitary body including a cavity, a protrusion extending into the cavity and a cantilevered spring element extending into the cavity, the spring element being resiliently flexible between a first position in which a space between the spring element and the protrusion is less than a thickness of the body of the thermistor and a second position in which the space between the spring element and the protrusion is equal to the thickness of the body,
  wherein a first surface of the body contacts the spring element and a second surface of the body opposite the first surface contacts the protrusion when the body is received within the cavity.

2. The terminal-thermistor assembly of claim 1, wherein the spring element is undeflected prior to the thermistor being inserted into the cavity and deflected opposite the protrusion when the thermistor is fully inserted into the cavity.

3. The terminal-thermistor assembly of claim 2, wherein the thermistor second surface is in continuous connection with the protrusion and the thermistor first surface is in continuous connection with the spring element when the thermistor is fully inserted into the cavity.

4. The terminal-thermistor assembly of claim 3, wherein a second flexible spring element is fixedly attached to the housing.

5. The terminal-thermistor assembly of claim 4, wherein each of the flexible spring elements form an L shape from the housing.

6. The terminal-thermistor assembly of claim 5, wherein the terminal includes a platform extending from an end of the housing opposite the shaft.

7. The terminal-thermistor assembly of claim 6, wherein the platform includes a platform arm and a platform surface perpendicular to each other.

8. The terminal-thermistor assembly of claim 7, further comprising a power conduit that powers the terminal.

9. The terminal-thermistor assembly of claim 8, wherein the power conduit is contained in a heat shrunk tube.

10. The terminal-thermistor assembly of claim 9, wherein the power conduit includes a first end, the first end attached to the platform.

11. The terminal-thermistor assembly of claim 10, wherein the thermistor measures temperature from the power conduit and the terminal.

12. A terminal for engaging a thermistor including a body encasing a temperature-sensing element, the terminal comprising a shaft and a housing disposed on an end of the shaft, the housing being a single unitary body including a cavity, a protrusion extending into the cavity and a cantilevered spring element extending into the cavity, the spring element being resiliently flexible between a first position in which a space between the spring element and the protrusion is less than a thickness of the body of the thermistor and a second position in which the space between the spring element and the protrusion is equal to the thickness of the body, the spring element contacting a first surface of the body and the protrusion contacting a second surface of the body opposite the first surface when the body is received within the cavity.

13. The terminal of claim 12, wherein the second surface of the thermistor body is in continuous contact with the protrusion and the first surface of the thermistor body is in continuous contact with the spring element when the thermistor is fully received into the cavity.

14. The terminal of claim 13, wherein a second flexible spring element is fixedly attached to the housing.

15. The terminal of claim 14, further comprising a platform forming an L shape and extending from the housing.

16. The terminal of claim 15, further comprising a power conduit that powers the terminal.

17. The terminal of claim 16, wherein the power conduit includes a first end, the first end attached to the platform.

18. The terminal of claim 17, wherein the thermistor measures temperature from the power conduit and terminal.

19. A terminal-thermistor assembly comprising:
   a thermistor including a body encasing a temperature-sensing element; and
   a terminal including a shaft and a housing disposed on an end of the shaft, the housing having first and second walls that are parallel to each other and a third wall that is perpendicular to the first and second walls, the first, second and third walls being integrally formed with each other and defining a cavity, the third wall having a protrusion extending into the cavity, the first and second walls having first and second cantilevered spring elements, respectively, the first and second spring elements extending into the cavity and being resiliently flexible between a first position in which a space between the spring element and the protrusion is less than a thickness of the body of the thermistor and a second position in which the space between the spring element and the protrusion is equal to the thickness of the body,
   wherein a first surface of the body contacts the spring element and a second surface of the body opposite the first surface contacts the protrusion when the body is received within the cavity.

20. The terminal-thermistor assembly of claim 19, wherein each of the spring elements includes a connector arm and a tab element extending perpendicular to the connector arm, the tab element having a descending portion extending toward the protrusion and an ascending portion extending away from the protrusion and connecting at a tab element contact surface.

* * * * *